United States Patent Office 3,274,200
Patented Sept. 20, 1966

3,274,200
YOHIMBANOISOXAZOLES
John Shavel, Jr., Mendham, and Maximilian Von Strandtmann, Rockaway Township, N.J., assignors to Warner-Lambert Pharmaceutical Company, Morris Plains, N.J., a corporation of Delaware
No Drawing. Filed Oct. 24, 1961, Ser. No. 147,172
5 Claims. (Cl. 260—288)

The present invention relates to new and novel compounds having the formulae:

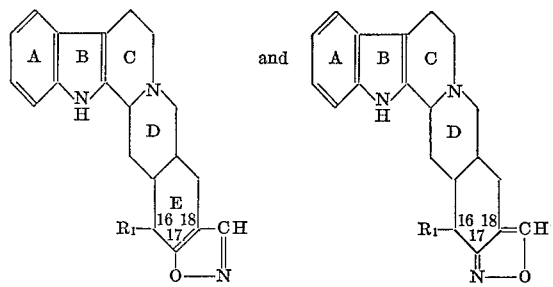

wherein $R_1$ is hydrogen or methyl, to a method of preparing these compounds and to the pharmaceutically acceptable non-toxic acid addition and quaternary ammonium salts thereof.

The compounds of this invention have interesting and significant pharmacological activity, being effective in reducing blood pressure. In addition, these compounds are valuable intermediates useful in the production of other compounds of the yohimbane series.

These compounds bear the A, B, C, D and E rings as depicted in the above formula and are alkaloids of the yohimbane series. Depending upon the configuration of the hydrogen atom at the 3 position and the existence of cis or trans fusion of the D and E rings, four different configurations are possible, that is, yohimbane, 3-epi-yohimbane, alloyohimbane and 3-epialloyohimbane. The present invention includes within its scope isoxazole derivatives of these four families of alkaloids bearing the substituents indicated in the above structural formulae.

In our application Serial No. 147,171 entitled "18-Hydroxymethylene Derivatives of Yohimbone, Process Therefor and Esters Thereof," filed concurrently herewith and now matured to U.S. 3,159,623, we have described the preparation of compounds of the formula

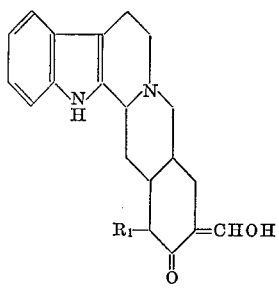

wherein $R_1$ is hydrogen or methyl. We have now found that the refluxing of these 18-hydroxymethylene derivatives of yohimbone alkaloids with an acid addition salt of hydroxylamine, for example hydroxylamine hydrochloride, in a medium comprising glacial acetic acid results in the preparation of an isomeric mixture of the following compounds:

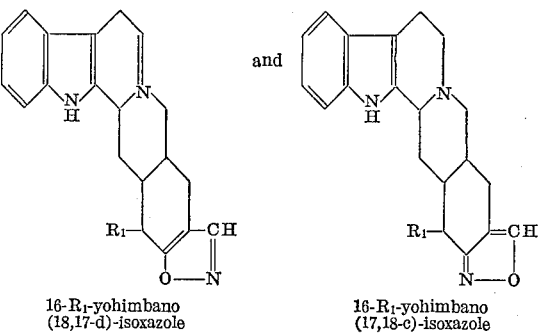

16-$R_1$-yohimbano (18,17-d)-isoxazole

16-$R_1$-yohimbano (17,18-c)-isoxazole

We have also found that the single isoxazole having the (17,18-c) configuration is obtained with hydroxylamine base is used and the reaction mixture contains glacial acetic acid and sodium acetate.

Where an acid addition salt of hydroxylamine is employed, the corresponding acid addition salt of the product may be precipitated from the reaction mixture at the conclusion of the reaction by the addition of water. The salt may in turn be converted to the free base by basification. Alternately, the addition of aqueous alkali to the reaction mixture results in the precipitation of the product as the free base directly.

The compounds of this invention may be converted into their pharmaceutically acceptable non-toxic acid addition or quaternary ammonium salts. Useful acid-addition salts are those formed with such acids as maleic, fumaric, benzoic, succinic, methylsulfonic, sulfonic, citric, tartaric, salicylic, malic, cinnamic, hydrochloride, hydrobromic, phosphoric and the like. The acid addition salts may be prepared in the conventional manner, for example, by treating a solution or suspension of the free base in an organic solvent with the desired acid, and then recovering the salt which forms by crystallization techniques. The quaternary salts are prepared by heating a solution of the base in a suitable solvent with a reactive alkyl halide such as methyl iodide, ethyl bromide, n-hexyl bromide, benzyl chloride or another reactive ester such as methyl sulfate, ethyl sulfate or methyl p-toluene sulfonate.

For therapeutic use, the new and novel compounds of this invention, either as the free base or in the form of a pharmaceutically acceptable, non-toxic acid addition or quaternary ammonium salt, may be formulated with a conventional pharmaceutical carrier to form tablets, capsules, elixirs, solutions, suspensions, suppositories and the like.

The following examples are included in order further to illustrate the present invention:

EXAMPLE 1

*Yohimbanoisoxazole*

10 g. 18-Hydroxymethyleneyohimbone is powdered with 10 g. hydroxylamine hydrochloride. To the mixture 150 ml. of hot acetic acid are added. The reaction mixture is brought to boiling with 15 min. by means of preheated oil bath, and refluxed for 10 min. After the addition of 300 ml. hot water the precipitated yohimbanoisoxazole hydrochloride is filtered off. Yield: 5.5 g., M.P. 313°–315° d. (darkening above 280°). The filtrate is made basic by the careful addition of ammonia and ice. The precipitated yohimbanoisoxazole is collected on a filter. Yield: 2.5 g.

The product is an isomeric mixture of yohimbano (17, 18-c)-isoxazole and yohimbano (18,17-d)-isoxazole.

EXAMPLE 2

Yohimbano (17,18-c)-isoxazole

To a solution of 4 g. hydroxylamine base in 60 ml. glacial acetic acid, 3 g. of powdered 18-hydroxymethyleneyohimbone and 0.5 g. sodium acetate are added. The resulting mixture is brought to boiling with a few minutes by the means of a preheated oil bath, and refluxed for 15 min. The solution is cooled by the addition of ice and made basic with 15% aqueous sodium hydroxide. The precipitate was filtered off and dried on clay. Yield: 2 g. of yohimbano (17,18-c)-isoxazole.

Recrystallization from acetone-water yields an analytical sample, M.P. 226° dec., $[\alpha]_D^{25} = -200°$ (pyridine, c.=0.8).

*Analysis.*—Calc.: C, 75.21; H, 6.63; N, 13.16. Found: C, 74,89; H, 6.66; N, 13.04.

EXAMPLE 3

16α-methylyohimbanoisoxazole 5 g. 18-hydroxymethylene-16α-methylyohimbone is powdered with 10 g. hydroxylamine hydrochloride. To this mixture 100 ml. hot acetic acid are added. The reaction mixture is brought to boiling within 5 min. by means of a preheated oil bath, and then is refluxed for 10 min. After the addition of 300 ml. water, the precipitated 16α-methylyohimbanoisoxazole hydrochloride is collected on a filter and dried in a vacuum desiccator over sulfuric acid. Yield: 2.5 g.

The filtrate is made basic by the careful addition of ammonia and ice. The precipitated base is filtered off and dried as above. Yield: 1.3 g.

The base is purified for analysis by recrystallization from acetone-water., M.P. 268°–272° (slow charring above 230°), $[\alpha]_D^{25} = -181°$ (pyridine, c.=0.5).

*Analysis.*—Calc.: C, 75.65, H; 6.95; N, 12.60. Found: C, 75.37; H, 6.84; N, 12.48.

The product is an isomeric mixture of 16α-methylyohimbano (17,18-c)-isoxazole and 16α-methylyohimbano (18,17-d)-isoxazole.

In the foregoing examples, all temperatures are given in degrees centigrade.

It is understood that the foregoing detailed description is given merely by way of illustration and that many variations may be made therein without departing from the spirit of our invention.

Having described our invention, what we desire to secure by Letters Patent is:

1. A member selected from the group consisting of compounds of the formulas:

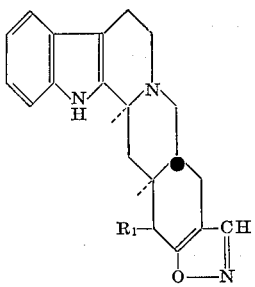 and 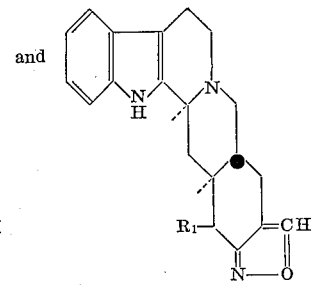

and mixtures thereof wherein $R_1$ is a member selected from the group consisting of hydrogen and methyl, and the pharmaceutically acceptable nontoxic acid addition salts selected from the group consisting of maleate, fumarate, benzoate, succinate, methyl-sulfonate, sulfonate, citrate, tartrate, salicylate, malate, cinnamate, hydrochloride, hydrobromide, phosphate, methyliodide, ethylbromide, n-hexylbromide, benzylchloride, methylsulfate, ethylsulfate and methyl p-toluene sulfonate.

2. A composition selected from the group consisting of an isomeric mixture of yohimbano (17,18-c)-isoxazole and yohimbano (18,17-d)-isoxazole and the pharmaceutically acceptable nontoxic acid addition salts thereof selected from the group consisting of the maleate, fumarate, benzoate, succinate, methylsulfonate, sulfonate, citrate, tartrate, salicylate, malate, cinnamate, hydrochloride, hydrobromide, phosphate, methyliodide, ethylbromide, n-hexylbromide, benzylchloride, methylsulfate, ethylsulfate and methyl p-toluene sulfate salts.

3. A composition selected from the group consisting of an isomeric mixture of 16α-methylyohimbano (17,18-c)-isoxazole and 16α-methylyohimbano (18,17-d)-isoxazole and the pharmaceutically acceptable nontoxic acid addition salts thereof selected from the group consisting of the maleate, fumarate, benzoate, succinate, methylsulfonate, sulfonate, citrate, tartrate, salicylate, malate, cinnamate, hydrochloride, hydrobromide, phosphate, methyliodide, ethylbromide, n-hexylbromide, benzylchloride, methylsulfate, ethylsulfate and methyl p-toluene sulfate salts.

4. Yohimbano (17,18-c)-isoxazole.

5. A composition selected from the group consisting of an isomeric mixture of yohimbano (17,18-c)-isoxazole and yohimbano (18,17-d)-isoxazole and the pharmaceutically acceptable nontoxic acid addition salts thereof.

References Cited by the Examiner

Johnson et al.: Jour. Amer. Chem. Soc., vol. 67 (1945), pages 1745–1749.

WALTER A. MODANCE, *Primary Examiner.*

IRVING MARCUS, *Examiner.*

J. PATTEN, *Assistant Examiner.*